Jan. 19, 1954 — R. D. PHARES — 2,666,332
SPEED CHANGE PULLEY FOR DRILL PRESSES
Filed May 8, 1952 — 2 Sheets-Sheet 1

INVENTOR.
ROBERT D. PHARES
BY Scott L. Norvell

Jan. 19, 1954        R. D. PHARES        2,666,332
SPEED CHANGE PULLEY FOR DRILL PRESSES
Filed May 8, 1952        2 Sheets-Sheet 2

INVENTOR.
ROBERT D. PHARES
BY Scott L. Nowrie

Patented Jan. 19, 1954

2,666,332

UNITED STATES PATENT OFFICE 2,666,332

SPEED CHANGE PULLEY FOR DRILL PRESSES

Robert D. Phares, Phoenix, Ariz.

Application May 8, 1952, Serial No. 286,689

5 Claims. (Cl. 74—230.17)

This invention pertains to speed change pulleys for drill presses and the like.

More particularly the type of pulley speed changers here shown made out of two speed change V belt pulleys having axially sliding central portions arranged to pay out one belt while the second belt is drawn in, in order to secure a different effective diameter for each of the two belts.

One of the objects of the invention is to provide a speed change pulley system for drill presses or other light power driven tools wherein two automatically working speed change pulleys are mounted between a driving pulley on a motor shaft and a driven pulley on the drill spindle shaft so that they move in unison in a vertical plane between the driving and driven pulleys and are arranged so that they mutually compensate for axial displacement of the belts that takes place when the speed ratios are changed.

Another object is to provide a pulley bracket and system of pulleys mounted thereon, which are of the speed change type having a sliding intermediate pulley part arranged for mounting on a drill press so that the ratios obtainable are of the order of one to twelve or more, and are much greater than any ratios which may be obtained by the use of a single speed change pulley of the type mentioned.

Another object is to provide a bracket and speed change pulley system, as above stated, with control means which will positively shift the pulley bracket to effect speed changes and hold the bracket in any desired adjustment and at the same time register the rotative speed of the driven pulley.

Another object is to provide a bracket and combination of speed change pulleys of the type above described, arranged so that the belts running between the several pulleys are maintained in alignment throughout the entire speed change operation.

Other objects will appear hereinafter.

I attain the foregoing objects by means of the devices, mechanism and structure illustrated in the accompanying drawings in which—

Similar numerals refer to similar parts in the several views.

Figure 1:
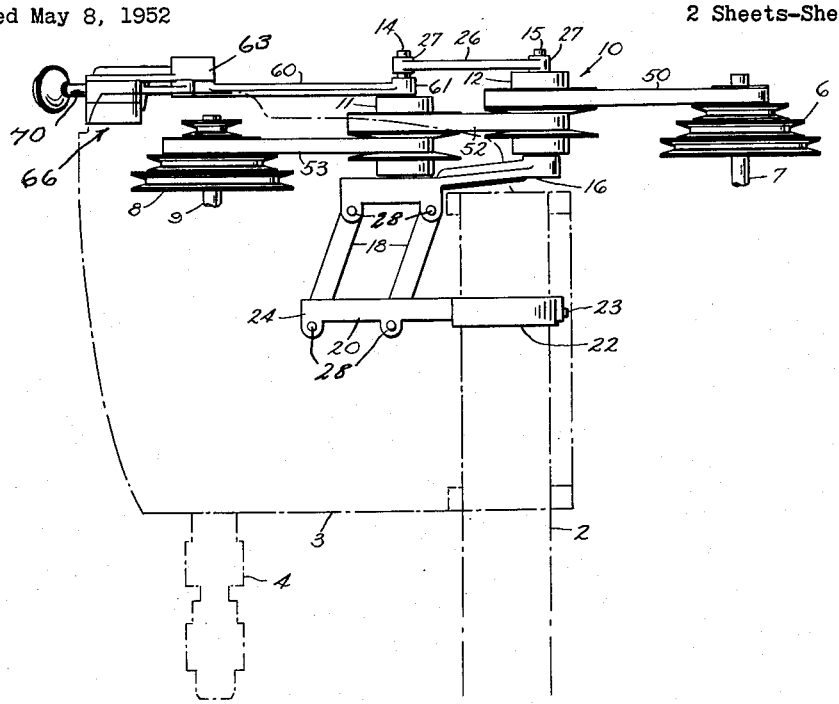
Figure 1 is a side elevation of my improved speed change mechanism as it would appear mounted on a drill press having a vertical column.

In Figure 1 of the drawings the mechanism is shown as it would appear mounted on a drill press column with the drill press column 2 and head casting 3 and drill quill 4 shown in dotted lines to indicate their relative positions. Numeral 6 indicates a driving pulley mounted on motor shaft 7, and numeral 8 indicates a driven pulley mounted on drill spindle shaft 9.

The speed change mechanism here concerned is generally indicated by numeral 10. This includes two speed change pulleys 11 and 12 mounted on shafts 14 and 15, respectively. These shafts are mounted on a base bracket 16 which is pivotally supported on the upper ends of parallel spaced links 18 which are, in turn, pivotally supported on drill column bracket 20. The two links between the two brackets are attached at their ends to said brackets by pins 28 which extend transversely to the longitudinal extent of said brackets and are proportioned and arranged to maintain parallel alignment between base bracket 16 and column bracket 20. The column bracket has a mounting ring 22 which fits over drill column 2 and may be held in place by a set screw 23. The forward portion 24 of this bracket extends longitudinally forward from the drill press column and has its longitudinal center in an axial plane which may be projected to include the axis of motor shaft 7 and of spindle shaft 9. The longitudinal center of base bracket 16 is parallel to the center of column bracket part 24. The motion attainable by bracket 16 and designated herein as the "speed varying" motion lies in this same plane.

Bracket 16 is shaped so that rear speed change pulley 12 on shaft 15 is held slightly higher than forward speed change pulley 11. Pulley 12 is adjacent driving pulley 6, and pulley 11 is adjacent driven pulley 8.

Pulleys 11 and 12 are composite, and include the usual structure attendant to this type of speed-change pulley and both operate on vertical parallel shafts. The axes of these shafts also lie within the plane above mentioned. In order to steady these shafts and maintain their relative position and parallelism a steadying link 26, having eyes 27 at each end, is attached to their upper ends.

The detailed structure of each of the pulleys 11 and 12 is conventional. However, in order to fully explain performance here the details of each pulley are as follows:

The upper half 30 which includes a hub 31 and a half pulley flange 32 is pressed on to the upper end of sleeve 33. The lower pulley half 34 which also includes a hub 35 and a complementary half flange 36 is pressed on to the lower end of sleeve 33. Ball bearings 37 are pressed into each end of sleeve 33 and bear on shaft 15. Between the faces 32 and 36 of said pulley halves there is an axially slideable pulley part 40. This has a bearing thimble 41 which slides on the outside of sleeve 33 between the pulley faces 32 and 36. On the upper side it has a belt face 43 which is complementary to the upper pulley face 32, and on the lower side it has a belt face 44 which is complementary to lower pulley face 36. It is to be understood that pulley 11 has the same detailed structure. V belt 50 which runs from a V belt groove on driving pulley 6 to the space between upper pulley half 30 and the intermediate shiftable pulley part 40 may be termed the motor driving belt. In the lower portion of pulley 12 betwen the lower face of shiftable pulley part 40 and the upper face 36 of lower pulley part 34 there is an intermediate belt 52 which runs between pulleys 12 and 11. The opposite, or outer, end of this intermediate belt runs in the upper V belt groove of pulley 11; that is, between the faces of its upper pulley part and its shiftable pulley part. The lower grooved portion of pulley 11 receives the rear loop end of drill spindle pulley belt 53, an outer loop of which runs over a V belt groove in drill spindle pulley 8.

As above explained, the motion of shifting bracket 16 between the shafts 7 and 9 is forward and aft in a vertical plane between the shafts. To attain this motion, and to locate it in a position convenient to the user of the drill, I provide a link 60 the inner end of which has a lug 61 fitted over shaft 14. The outer end of this link is pivotally attached to arm 63 at the inner end of manually operated shifting lever 64. Lever 64 is, in turn, pivoted on shaft 65 on supporting frame 66. The front portion of this frame has an arcuate surface 67 to afford space for indicia 68, to indicate speeds attained by the shifting motion of the assembly 10. A pointer 69 on the outer end of lever 64 indicates positions of this lever on arcuate surface 67. Supporting frame 66 is affixed to the front end portion of head casting 3 and held in place by screw 73. The outer end of lever 64 may be swung arcuately by handle 70. Twisting this handle will set shoe 72 at its inner end against arcuate surface 67 and hold lever 69 in the position desired.

Figure 2:
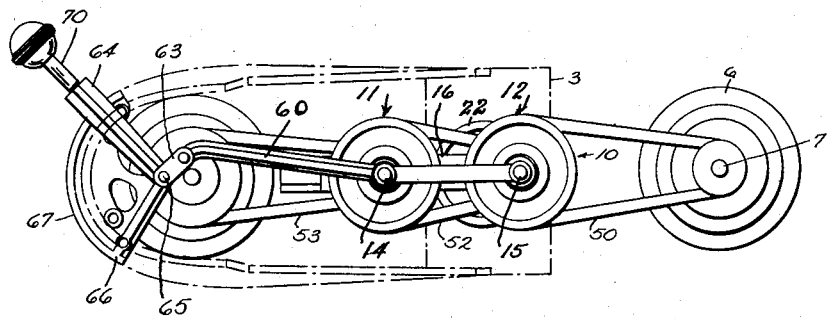
Figure 2 is a plan view thereof.

In use, the device is mounted on a drill press column 2 as shown in Figures 1 and 2 and belts 50, 52 and 53 fitted over respective pulleys as above described. When the bracket 16 moves to its extreme rearward limit of motion belt 50 runs in the outer portion of the upper groove space between faces 32 and 43 of pulley 12. Thus, if the upper groove of driving pulley 6 is of a smaller diameter than the effective diameter of the upper groove of pulley 12, there is a speed reduction between shaft 7 and pulley 12. Belt 52 in this position is crowded into the bottom of the lower groove portion of pulley 12, between faces 44 and 36 of the pulley parts and this lower groove is of small diameter compared with that of the outer effective grove of pulley 11. The lower groove of pulley 11 receives belt 53 which runs near the hub of this pulley portion and over a somewhat larger V belt pulley groove on driven pulley 8. The speed reduction between shafts 7 and 9 is maximum in this position. There are three reducing ratios; first, betwen pulleys 6 and 12; second, between pulleys 12 and 11; third, between pulleys 11 and 8. Now, if lever 64 is swung counterclockwise (Figure 2) from the position in which it appears, then lever part 63 pulls link 60 and part 10 from pulley 6 and shaft 7 and toward pulley 8 and shaft 9. When this is done the forward or outer loop of belt 50, which runs in the upper effective groove of pulley 12, moves shiftable pulley portion 40 downward as it crowds deeper into said upper effective groove. This downward motion of shiftable pulley portion 40 crowds the rear loop of intermediate belt 52 outward toward the rim of the lower effective groove of said pulley. This action in turn crowds the forward loop portion of belt 52 which runs in the upper effective groove of pulley 11 toward the hub of this pulley and this, in turn, similarly crowds the rear loop of belt 53 toward the rim of the lower effective groove of pulley 11. The belts stay in the same tension because the pulley flanges of the grooves and effective grooves are all made at the same angle. The result of this action is that as the pulley assembly 10 moves forward bracket 16 occupies the space indicated by dotted line 16a in Figure 3. Pulleys 11 and 12 occupy the positions indicated by dotted lines 11a and 12a. Belt 50 will then be at the bottom of the upper effective groove of pulley 12 and will turn the pulley faster. Belt 52 will be at the outer portion of the effective lower groove of pulley 12 while the converse is true of this belt in the upper effective groove of pulley 11. Therefore, pulley 11 will turn faster. For the same reason the rear loop of belt 53, being crowded toward the periphery of lower effective groove of pulley 11, will drive pulley 8 at a greater speed. There are therefore three increased ratios between the speeds of the several parts.

Figure 3:
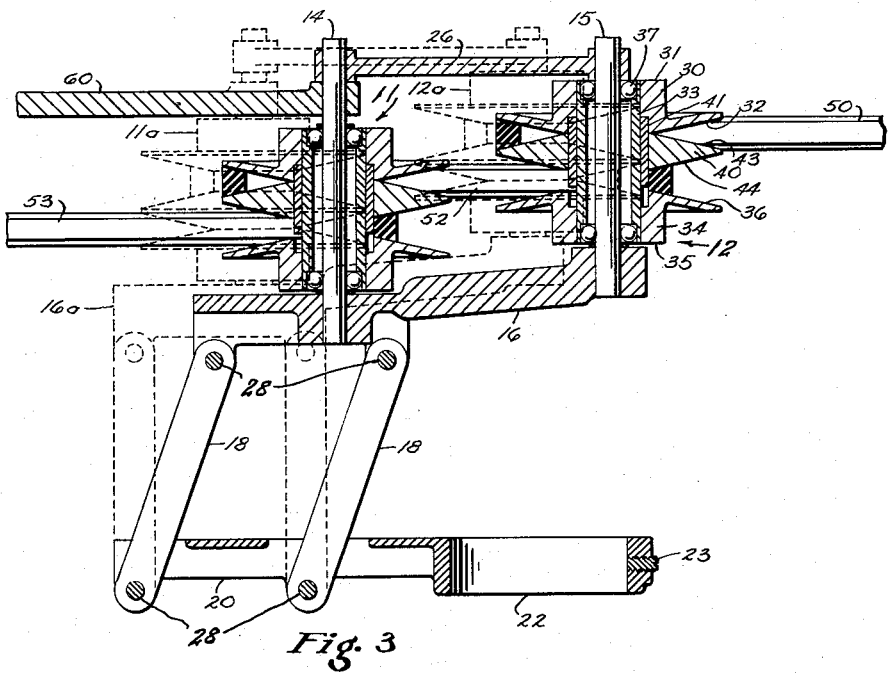
Figure 3 is a vertical side sectional view of the double (dual) speed change pulleys, and the mounting mechanism and bracket therefor, drawn on a somewhat enlarged scale.
Figures 4, 5:
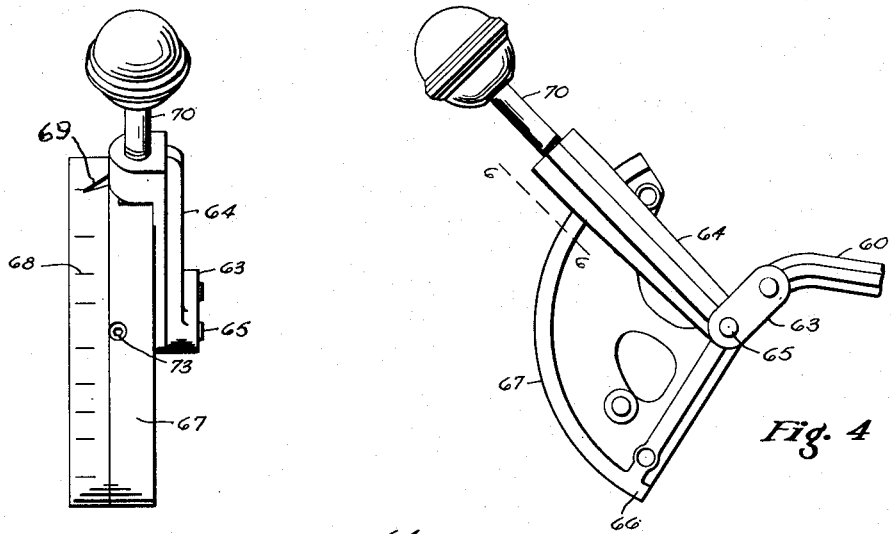
Figure 4 is a plan view of the control lever and attendant mechanism for varying the speed ratio afforded by this device.
Figure 5 is a front elevation thereof.
Figure 6:
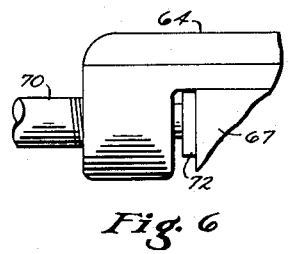
Figure 6 is a fragmentary side elevation of said speed varying mechanism taken substantially on line 6—6 of Figure 4.

By this means the overall speed change ratio between shafts 7 and 9 can be as high as one to twelve; that is, if the position shown in Figure 2 be considered unity then when the mechanism assembly is moved to the position shown by dotted lines in Figure 3 the speed imparted to shaft 9 is twelve times that which it had in the first position.

It is to be observed that base bracket 16 in moving from the position shown in solid lines, Figure 3, to the position indicated by 16a is displaced upward somewhat due to the arcuate path in which the upper transverse pins of links 18 travel. It is also apparent that upper pulley part 30 of pulley 12 moves upward relative to belt 50. Belt 50 maintains the same horizontal position, however, and to keep it in this position the movable pulley part 40 slides downward on sleeve 33. It is this downward movement of part 40 that crowds the rear loop of belt 52 outward from the hub portion of the lower effective groove of this same pulley. At the same time the center pulley part of pulley 11 moves upward to accommodate the upward movement of the lower flanged pulley half of speed change pulley 11, thus keeping belt 53 in its same horizontal plane as it moves to the outer part of the lower effective groove of this pulley. As illustrated, the speed change assembly 10 moves from a lower position, as shown by solid lines in the figures, to the position shown by dotted lines in Figure 3. The belt system is arranged so that the belts stay in the same horizontal position throughout the movement indicated. Should the links move beyond the vertical position shown by dotted lines, the effect desired would not be gained. However, there is no need for this as a sufficient longitudinal movement between the driving and driven pulleys can be gained by the movement as shown. Obviously, if it becomes desirable to move the assembly from the raised position 16a to a lowered position forward from it (not shown), the position of the belts can be changed relative to the grooves which they occupy in the two speed change pulleys. As illustrated, it is clearly apparent that since the horizontal position of belts 50 and 53 is not changed during the speed varying motion their tensions are not disturbed. This condition can be attained by making the length of links 18 such that the upward motion of the transverse pins 28 at their upper ends equals the drop which takes place in the upper effective groove of pulley 12. Also the change which takes place in the horizontal position of the lower effective groove of pulley 11 is correspondingly varied. The structure here shown lends itself to this desired arrangement.

From the foregoing it will be seen that I have not only provided structure and mechanism which will produce a large variation in speed between the driving and driven shafts, but will also maintain the driving and driven belts 50 and 53, at the same tension throughout the speed varying motion. In view of the foregoing, I make the following claims.

I claim:

1. In a drill press having a vertical column supporting a head casting, and a vertical drill spindle shaft carrying a V belt pulley on the front side of said column, and a driving V belt pulley mounted on a vertical motor shaft on the back side of said column; the axes of said drill press shaft, motor shaft and said column being in the same vertical plane; the combination therewith of a speed change driving mechanism composed of a column bracket having a forwardly extending portion attached to said column at its rear, a base bracket for speed-change pulleys disposed above said column bracket and supported by parallel, substantially vertical, links pivotally attached at their ends to said brackets to allow fore and aft movement of said base bracket in the plane of the axes of said drill press shaft and column; speed change pulleys having upper and lower effective grooves and an axially shiftable centrally disposed pulley part mounted parallel in fore and aft spaced relation on said base bracket; a V belt extending from said motor shaft pulley to the upper groove of the aft pulley on said base bracket; an intermediate belt extending from the lower groove of said aft pulley to the upper groove of said fore positioned pulley; a V belt pulley extending from the lower groove of said fore pulley to the pulley on said drill spindle; and manually operated lever and link mechanism for moving said speed change pulleys and base bracket fore and aft in the said plane of said drill spindle shaft and motor shaft and for holding said pulleys fixed at any position throughout said movement.

2. In a drill press having a vertical column, a head, a vertical drill spindle shaft carrying a driven V belt pulley operating on one side of said column and a driving V belt pulley mounted on a vertical motor shaft on the opposite side of said column; the axes, said drill press shaft, motor shaft and said column being in the same vertical plane; speed change driving mechanism, including a column bracket attached to said drill press column, a speed change pulley shaft base bracket disposed thereabove and attached to said column bracket by a pair of spaced parallel links pivotally attached at their ends to said brackets by transverse pins; speed change pulley shafts mounted in spaced relationship on said base bracket, with their axes extending in the same plane as the said drill spindle shaft and driving pulley shaft; speed change pulleys of the type having axially fixed upper and lower halves and a complementary pulley part axially shiftable between said pulley halves, journalled on said speed change pulley shafts; a motor driving V belt running over said driving V belt pulley and the upper groove of the speed change pulley on said base bracket positioned adjacent to said driving pulley; an intermediate V belt running in the lower groove of said speed change pulley and the upper groove of the speed change pulley positioned adjacent the driven V belt pulley on said drill spindle; a V belt running in the lower groove of said speed change pulley and said V belt pulley on said drill spindle; a lever pivotally mounted on a frame on said drill head having a manually operable shifting lever connected by a link to said speed change driving mechanism shifting it fore and aft between said drill press shaft and motor shaft; an arcuate plate on said frame having an indicating scale; and a pointer on said lever for indicating arcuate positions of said lever on said scale; said base bracket being disposed on said links above said column bracket so that as it is shifted fore and aft between said driven shaft and said motor shaft the speed change pulleys thereon are raised and lowered by the arcuate movement of the upper ends of said links so that said belts running between the V belt pulley on said motor shaft and the adjacent speed change pulley, and the V belt running between the pulley on the drill spindle shaft and the speed change pulley adjacent thereto are maintained horizontal throughout the fore and aft motion of said speed change shifting motion imparted by said shifting lever.

3. In a drill press having a vertical column, a head casting thereon extending fore and aft, a vertical drill spindle shaft having a V belt pulley on its upper end operating within the fore part of said head casting, a motor shaft having a V belt pulley on its upper end portion operating in the aft part of said head casting, speed change driving mechanism consisting of a column bracket attached to said drill press column having a forwardly extending portion to pivotally support a base bracket disposed above said column bracket and extending parallel thereto; a pair of links longitudinally spaced, extending between said column bracket and base bracket, and pivotally attached at their ends to said brackets to provide fore and aft motion for said base bracket between said spindle shaft pulley and said motor shaft pulley and vertical motion for said base bracket relative to said column bracket; a pair of V belt speed change pulleys having upper and lower V grooves formed on each side of an axially slidable pulley part, mounted fore and aft on said base bracket and operating on vertical shafts lying in a vertical plane which includes the axes of said drill spindle shaft and motor shaft; a driving belt running from said motor shaft pulley to one of the grooves on said aft speed change pulley; an intermediate V belt running from the other groove on said aft speed change pulley to the groove on said fore speed change pulley in horizontal alignment with said driving belt; a driven V belt operating between the other groove on said fore pulley and spindle shaft pulley; and lever mechanism for moving said speed change driving mechanism fore and aft between said motor shaft and said spindle shaft to attain varying speeds between said shafts; said base bracket being disposed on said links so that the arcuate path of the upper ends thereof, during said fore and aft motion, imparts vertical motion to the speed change pulleys thereon maintaining said driving and driven belts horizontal throughout said shifting motion.

4. In a drill press having a vertical column, a head casting thereon extending fore and aft, a vertical drill spindle shaft having a V belt pulley on its upper end operating within the fore part of said head casting, a motor shaft having a V belt pulley on its upper end portion operating in the aft part of said head casting, speed change driving mechanism consisting of a column bracket attached to said drill press column having a forwardly extending portion, a base bracket disposed above said column bracket and extending parallel thereto; a pair of links longitudinally spaced, extending between said column bracket and base bracket, and pivotally attached at their ends to said brackets to provide fore and aft and upward and downward motion for said base bracket between said spindle shaft pulley and said motor shaft pulley; a pair of V belt speed change pulleys having upper and lower V grooves formed on each side of an axially slidable pulley part, monted fore and aft on said base bracket and operating on vertical shafts lying in a vertical plane which includes the axes of said drill spindle shaft and motor shaft; a driving belt running from said motor shaft pulley to one of the grooves on said aft speed change pulley; an intermediate V belt running from the other groove on said aft speed change pulley to the groove on said fore speed change pulley in horizontal alignment with said driving belt; a driven V belt operating between the other groove on said fore pulley and spindle shaft pulley, and manually operated lever mechanism connected to said base bracket to move it fore and aft within predetermined limits so that the arcuate movement of said base bracket on said links provides vertical displacement for said speed change pulleys to offset the vertical change in the effective grooves of said pulleys when their speed ratio is changed so that said driving and driven belts will operate in the same plane throughout the shifting movement of said base bracket.

5. In a drill press having a vertical column supporting a head casting, and a vertical drill spindle shaft carrying a V belt pulley on the front side of said column, and a driving V belt pulley mounted on a vertical motor shaft on the back side of said column; the axes of said drill press shaft, motor shaft and said column being in the same vertical plane; the combination therewith of a speed change driving mechanism composed of a column bracket having a forwardly extending portion attached to said column at its rear, a base bracket for speed change pulleys disposed above said column bracket and supported by parallel, substantially vertical, links pivotally attached at their ends to said brackets to allow fore and aft movement of said base bracket in the plane of the axes of said drill press shaft and column and to provide vertical movement to maintain said speed change pulleys in a vertical position so that the belts extending from said motor pulley and drill press shaft are maintained in horizontal alignment throughout said speed change shifting movement; speed change pulleys having upper and lower effective grooves and an axially shiftable centrally disposed pulley part mounted parallel in fore and aft spaced relation on said base bracket; a V belt extending from said motor shaft pulley to the upper groove of the aft pulley on said base bracket; an intermediate belt extending from the lower groove of said aft pulley to the upper groove of said fore positioned pulley; a V belt pulley extending from the lower groove of said fore pulley to the pulley on said drill spindle; and manually operated lever and link mechanism for moving said speed change pulleys and base bracket fore and aft in the said plane of said drill spindle shaft and motor shaft and for holding said pulleys fixed at any position throughout said movement.

ROBERT D. PHARES.

References Cited in the file of this patent

UNITED STATES PATENTS

| Number | Name | Date |
|---|---|---|
| 2,209,484 | Tautz | July 30, 1940 |
| 2,258,970 | Buettell | Oct. 14, 1941 |
| 2,267,238 | Irwin | Dec. 23, 1941 |
| 2,594,663 | Lindell | Apr. 29, 1952 |